United States Patent
Sato (10) Patent No.: US 8,214,107 B2
(45) Date of Patent: Jul. 3, 2012

(54) VEHICLE BEHAVIOR CONTROL APPARATUS AND CONTROL METHOD

(75) Inventor: Hirofumi Sato, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 578 days.

(21) Appl. No.: 12/416,314

(22) Filed: Apr. 1, 2009

(65) Prior Publication Data

US 2009/0254251 A1    Oct. 8, 2009

(30) Foreign Application Priority Data

Apr. 2, 2008    (JP) .................................. 2008-095782

(51) Int. Cl.
 *B62D 6/02* (2006.01)
 *B62D 6/00* (2006.01)
(52) U.S. Cl. ............................. 701/41; 701/124; 74/5.4
(58) Field of Classification Search .............. 701/41, 701/124, 102, 36, 51, 53, 99, 3, 4, 5, 6, 13; 180/41, 291, 292, 298; 280/772; 74/5.22, 74/5.4

See application file for complete search history.

(56) References Cited

U.S. PATENT DOCUMENTS

| | | | | |
|---|---|---|---|---|
| 1,513,143 A | * | 10/1924 | Welch et al. | 446/233 |
| 3,547,381 A | * | 12/1970 | Shaw et al. | 244/171 |
| 5,098,041 A | * | 3/1992 | Uetrecht | 244/164 |
| 5,401,055 A | * | 3/1995 | Pham | 280/755 |
| 5,611,505 A | * | 3/1997 | Smay | 244/165 |
| 5,839,386 A | * | 11/1998 | Frieling et al. | 114/121 |
| 6,285,928 B1 | * | 9/2001 | Tilley et al. | 701/13 |
| 6,360,838 B1 | * | 3/2002 | Kulhavy | 180/219 |
| 6,571,892 B2 | * | 6/2003 | Kamen et al. | 180/8.2 |
| 6,843,344 B2 | * | 1/2005 | Kodama et al. | 180/446 |
| 7,349,786 B2 | * | 3/2008 | Takagi | 701/70 |
| 7,458,329 B2 | * | 12/2008 | Nedwed | 114/122 |
| 7,512,466 B2 | * | 3/2009 | Hart et al. | 701/22 |
| 2006/0085111 A1 | * | 4/2006 | Kojima | 701/38 |
| 2008/0147275 A1 | * | 6/2008 | Okazaki et al. | 701/41 |
| 2008/0234877 A1 | * | 9/2008 | Kimura et al. | 701/1 |
| 2008/0283326 A1 | * | 11/2008 | Bennett et al. | 180/246 |

(Continued)

FOREIGN PATENT DOCUMENTS

CN    101573245 A    11/2009

(Continued)

OTHER PUBLICATIONS

JP 2008-236958 English translation.*

(Continued)

*Primary Examiner* — Ruth Ilan
*Assistant Examiner* — Karen A Beck
(74) *Attorney, Agent, or Firm* — Oblon, Spivak, McClelland, Maier & Neustadt, L.L.P.

(57) ABSTRACT

A vehicle behavior control apparatus includes a rotary body formed as a part of a power plant installed in a vehicle, and a shaft deflection unit that sets a vehicle behavior target value for obtaining a target vehicle behavior, and deflects a direction of a rotary shaft of the rotary body relative to a vehicle body in accordance with the vehicle behavior target value. Thus, the vehicle behavior can be controlled appropriately by using a pre-existing vehicle constitutional component such as an engine or a motor as the rotary body, and using a gyro moment generated by deflecting the direction of the rotary shaft of the rotary body.

14 Claims, 9 Drawing Sheets

U.S. PATENT DOCUMENTS

| | | | |
|---|---|---|---|
| 2008/0283327 A1* | 11/2008 | Dieter et al. | 180/292 |
| 2008/0284124 A1* | 11/2008 | Brady et al. | 280/124.135 |
| 2008/0284574 A1* | 11/2008 | Bosch | 340/438 |
| 2009/0048050 A1* | 2/2009 | Kamada et al. | 475/150 |
| 2009/0216392 A1* | 8/2009 | Piasecki et al. | 701/3 |
| 2009/0254251 A1* | 10/2009 | Sato | 701/41 |
| 2010/0294585 A1* | 11/2010 | Wolff et al. | 180/298 |
| 2010/0301168 A1* | 12/2010 | Raposo | 244/171.2 |
| 2011/0191013 A1* | 8/2011 | Leeser | 701/124 |
| 2011/0309191 A1* | 12/2011 | McClure et al. | 244/79 |

FOREIGN PATENT DOCUMENTS

| | | |
|---|---|---|
| JP | 5-13878 | 2/1993 |
| JP | 6-33984 | 2/1994 |
| JP | 8-297027 | 11/1996 |
| JP | 10-341504 | 12/1998 |
| JP | 2007-8185 | 1/2007 |
| JP | 2007-23592 | 2/2007 |
| JP | 2007-106274 | 4/2007 |
| JP | 2007-239592 | 9/2007 |
| JP | 2008-236958 | 10/2008 |

OTHER PUBLICATIONS

Office Action mailed Aug. 24, 2010, in Japanese Patent Application No. 2008-095782, filed Apr. 2, 2008 (with partial English-language translation).

* cited by examiner

VEHICLE BEHAVIOR CONTROL APPARATUS AND CONTROL METHOD

INCORPORATION BY REFERENCE

The disclosure of Japanese Patent Application No. 2008-095782, filed on Apr. 2, 2009, including the specification, drawings and abstract, is incorporated herein by reference in its entirety.

BACKGROUND OF THE INVENTION

1. Field of the Invention

The invention relates to the technical field of vehicle behavior control.

2. Description of the Related Art

This type of technique is described in Japanese Patent Application Publication No. 2007-239592 (JP-A-2007-239592) and Japanese Patent Application Publication No. 2007-106274 (JP-A-2007-106274), for example. JP-A-200-239592 describes a technique for improving the operating performance of a vehicle by modifying a compression ratio target value of a variable compression ratio mechanism in accordance with a yaw rate generated when the vehicle turns, or in other words by modifying a center of gravity position of the vehicle. JP-A-2007-106274 describes a technique for turning a rear wheel in a direction for counteracting a yaw moment generated by rotation angular acceleration about a rotary axis of a drive source (an engine or the like).

Incidentally, when the direction of a shaft of a rotary body constituting a part of a power plant such as an engine is deflected during rotation of the rotary body, it is assumed that a gyro moment is generated in accordance with the law of conservation of angular momentum. However, JP-A-2007-239592 and JP-A-2007-106274 do not describe vehicle behavior control using this type of gyro moment.

SUMMARY OF THE INVENTION

The invention provides a vehicle behavior control apparatus that is capable of controlling vehicle behavior appropriately by deflecting the direction of a shaft of a rotary body constituting a part of a power plant.

A vehicle behavior control apparatus according to a first aspect of the invention includes: a rotary body formed as a part of a power plant installed in a vehicle; and a shaft deflection unit that sets a vehicle behavior target value for obtaining a target vehicle behavior, and deflects a direction of a rotary shaft of the rotary body relative to a vehicle body in accordance with the vehicle behavior target value.

This vehicle behavior control apparatus performs control on a vehicle to realize a target vehicle behavior. More specifically, the rotary body is formed as a part of a power plant such as an engine or a transmission that rotates as the engine rotates. Further, the shaft deflection unit deflects the direction of the rotary shaft of the rotary body relative to the vehicle body. When the rotary shaft is deflected during rotation of the rotary body, a gyro moment is generated in the vehicle. Hence, the shaft deflection unit causes the gyro moment to act on the vehicle by deflecting the direction of the rotary shaft of the rotary body in accordance with the vehicle behavior target value, thereby realizing the target vehicle behavior. Therefore, according to the vehicle behavior control apparatus described above, the vehicle behavior can be controlled appropriately by using a pre-existing vehicle constitutional component such as an engine or a motor as the rotary body, and using a gyro moment that is generated by deflecting the direction of the rotary shaft of the rotary body.

The shaft deflection unit may deflect the rotary shaft on the basis of a rotation speed of the rotary body.

The shaft deflection unit sets the degree to which the rotary shaft is to be deflected on the basis of the rotation speed of the rotary body. In other words, the rotation speed of the rotary body varies according to the required driving force of the vehicle, and therefore the gyro moment that can be generated by deflecting the rotary shaft of the rotary body also varies in accordance with the required driving force. Hence, the shaft deflection unit deflects the rotary shaft on the basis of the rotation speed of the rotary body. Thus, an appropriate gyro moment can be caused to act on the vehicle.

The shaft deflection unit may set a speed at which the rotary shaft is deflected on the basis of a rotation speed of the rotary body. In so doing, an even more appropriate gyro moment can be caused to act on the vehicle.

The rotary shaft of the rotary body may be disposed in a front-rear direction of the vehicle, and the shaft deflection unit may deflect the direction of the rotary shaft by varying a pitch angle of the rotary body. When the pitch angle of the rotary body is varied in a vehicle constituted in this manner, a gyro moment (yaw moment) is generated about a yaw axis of the rotary body such that a moment acts on the vehicle in a yaw direction. Thus, an operating performance of the vehicle in the yaw direction can be improved using a yaw moment generated by varying the pitch angle of the rotary body.

The rotary shaft of the rotary body may be disposed in a right-left direction of the vehicle, and the shaft deflection unit may deflect the direction of the rotary shaft by varying a pitch angle of the rotary body. In a vehicle constituted in this manner, the operating performance of the vehicle in the yaw direction can be improved similarly by using a gyro moment (yaw moment) generated by varying the pitch angle of the rotary body.

The shaft deflection unit may set the vehicle behavior target value on the basis of steering performed by a driver in order to obtain a target vehicle behavior in relation to a yaw direction of the vehicle. In so doing, the yaw direction operating performance of the vehicle relative to steering performed by the driver can be improved. For example, the responsiveness of the vehicle to steering input can be improved.

The rotary shaft of the rotary body may be disposed in a front-rear direction of the vehicle, and the shaft deflection unit may deflect the direction of the rotary shaft by varying a yaw angle of the rotary body. When the yaw angle of the rotary body is varied in a vehicle constituted in this manner, a gyro moment (pitch moment) is generated about a pitch axis of the rotary body such that a moment acts on the vehicle in a pitch direction. Hence, according to the vehicle behavior control apparatus described above, an operating performance of the vehicle in the pitch direction can be improved using a pitch moment generated by varying the yaw angle of the rotary body.

The shaft deflection unit may set the vehicle behavior target value on the basis of an attitude of the vehicle in order to obtain a target vehicle behavior in relation to a pitch direction of the vehicle. In so doing, the attitude of the vehicle can be stabilized during acceleration and deceleration, for example.

The rotary shaft of the rotary body may be disposed in a right-left direction of the vehicle, and the shaft deflection unit may deflect the direction of the rotary shaft by varying a yaw angle of the rotary body. When the yaw angle of the rotary body is varied in a vehicle constituted in this manner, a gyro moment (pitch moment) is generated about the pitch axis of the rotary body such that a moment acts on the vehicle in a roll direction. Thus, the operating performance of the vehicle in the roll direction can be improved using a pitch moment generated by varying the yaw angle of the rotary body.

The shaft deflection unit may set the vehicle behavior target value on the basis of steering performed by a driver in order to obtain a target vehicle behavior in relation to a roll direction of the vehicle. In so doing, the attitude of the vehicle can be stabilized when the vehicle turns, for example.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Embodiments of the invention will be described below with reference to the drawings.

First, a first embodiment of the invention will be described with reference to the drawings.

Figure 1:
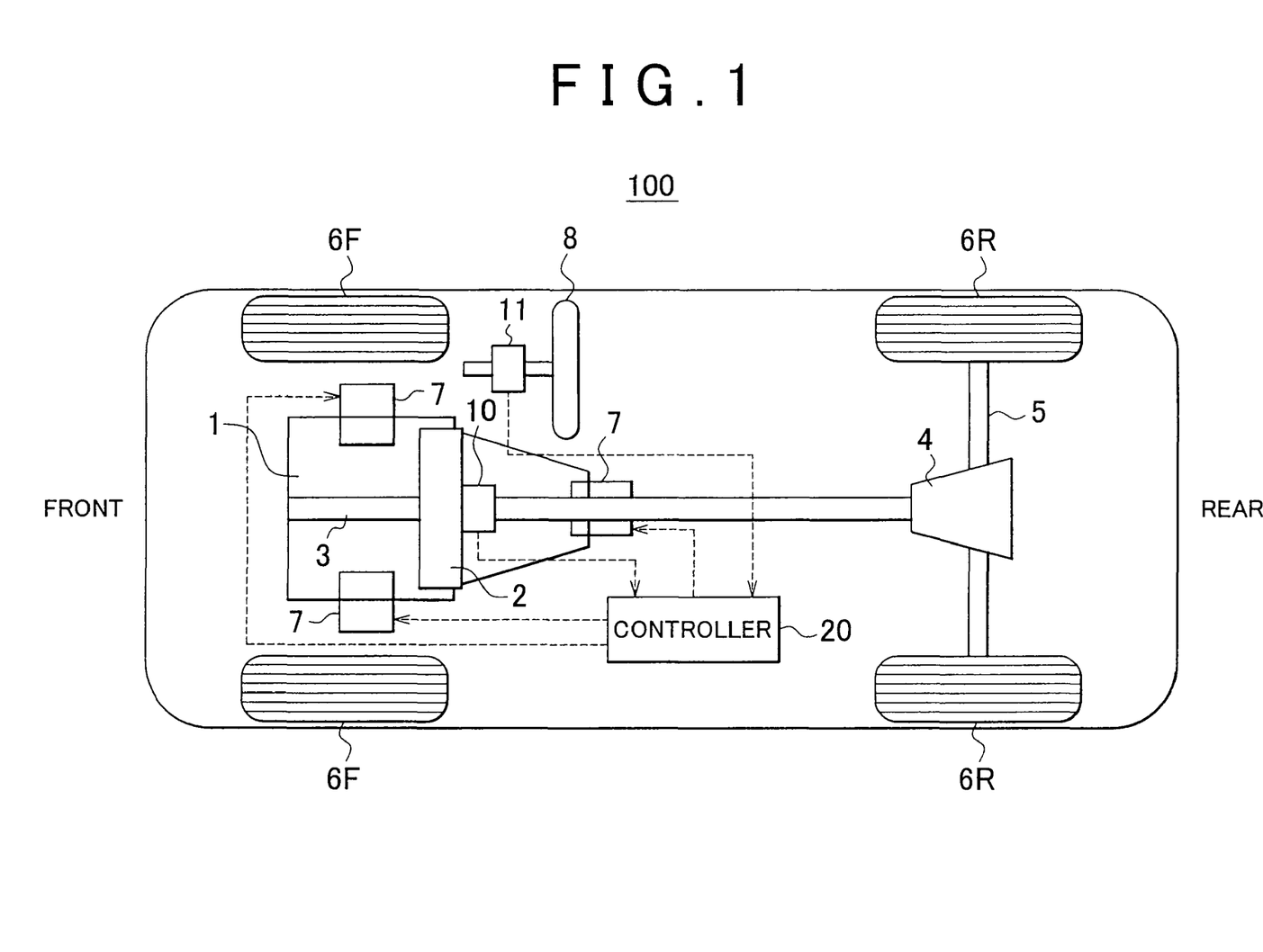
FIG. 1 is a schematic constitutional diagram of a vehicle according to a first embodiment.

FIG. 1 is a schematic diagram showing the constitution of a vehicle 100 to which a vehicle behavior control apparatus according to the first embodiment is applied. FIG. 1 is a view of the vehicle 100 seen from above, in which the left direction denotes the front of the vehicle, the right direction denotes the rear of the vehicle, and broken line arrows denote signal input/output.

The vehicle 100 mainly includes a power plant 1, a rotary body 2, a rotary shaft 3, a differential gear 4, a drive shaft 5, front wheels 6F, rear wheels 6R, a power plant movement control apparatus 7, a steering wheel 8, an engine rotation speed sensor 10, a steering angle sensor 11, and a controller 20. Note that the vehicle 100 corresponds to an FR vehicle in which the power plant 1 is disposed on the front side and the rear wheels 6R are driven.

The rotary shaft 3 is disposed in the power plant 1 in a front-rear direction of the vehicle 100, and the power plant 1 includes an engine, a transmission, and so on, not shown in the drawing. In FIG. 1, the outer forms of the engine, transmission, and so on are represented by the outer form of the power plant 1. The rotary body 2 is formed as a part of the power plant 1, which rotates in accordance with the engine rotation speed. More specifically, the rotary body 2 rotates about a roll axis of the power plant 1 using the rotary shaft 3 as a central axis. The rotary body 2 corresponds to a plurality of rotary members (a fly wheel, a torque converter, and so on, for example) that rotate within the power plant 1 as the engine rotates. In FIG. 1, the rotary body 2 is shown as a single body for ease of description. The rotary shaft 3 corresponds to a rotary shaft of the rotary body 2, and to an output shaft to which power from the engine is transmitted. The power of the engine transmitted to the rotary shaft 3 is transmitted to the rear wheels (drive wheels) 6R via the differential gear 4 and the drive shaft 5. The engine rotation speed sensor 10 detects the rotation speed of the engine within the power plant 1, and transmits a detection signal corresponding to the detected engine rotation speed to the controller 20.

The power plant movement control apparatus 7 is provided in a plurality relative to the power plant 1, and is constituted to be capable of moving the power plant 1. More specifically, the power plant movement control apparatus 7 is constituted to be capable of varying a pitch axis angle of the power plant 1. In other words, the power plant movement control apparatus 7 rotates the power plant 1, including the rotary body 2, about a pitch axis. For example, the power plant movement control apparatus 7 is formed using a so-called active control mount (ACM) and may include a built-in actuator. The power plant movement control apparatus 7 is controlled by a control signal supplied by the controller 20.

The steering wheel 8 is used when a driver performs steering, and the steering angle sensor 11 detects a steering angle. The steering angle sensor 11 transmits a detection signal corresponding to the detected steering angle to the controller 20.

The controller 20 is an electronic control unit that includes a Central Processing Unit (CPU), Read-Only Memory (ROM), Random Access Memory (RAM), and so on, not shown in the drawing, and performs control on the respective constitutional elements of the vehicle 100. In this embodiment, the controller 20 performs vehicle behavior control by functioning as a shaft deflection unit according to the invention together with the power plant movement control apparatus 7. Specifically, the controller 20 sets a vehicle behavior target value to obtain a target vehicle behavior, and performs control to deflect the direction of the rotary shaft 3 of the rotary body 2 relative to a vehicle body in accordance with the vehicle behavior target value. More specifically, the controller 20 performs control to vary the pitch axis angle of the rotary body 2 by controlling the power plant movement control apparatus 7.

Next, a vehicle behavior control method according to the first embodiment will be described.

In the first embodiment, the controller 20 performs control to vary the pitch axis angle (to be referred to hereafter as the "pitch angle") of the rotary body 2. Specifically, the controller 20 controls a pitch angle velocity of the rotary body 2 by controlling the power plant movement control apparatus 7 such that a target vehicle behavior is obtained in relation to a yaw direction of the vehicle 100. More specifically, the controller 20 obtains the target vehicle behavior in the yaw direction of the vehicle 100 by controlling the pitch angle velocity of the rotary body 2 using a gyro moment that is generated by moving the rotary body 2 about the pitch axis.

Figure 2:
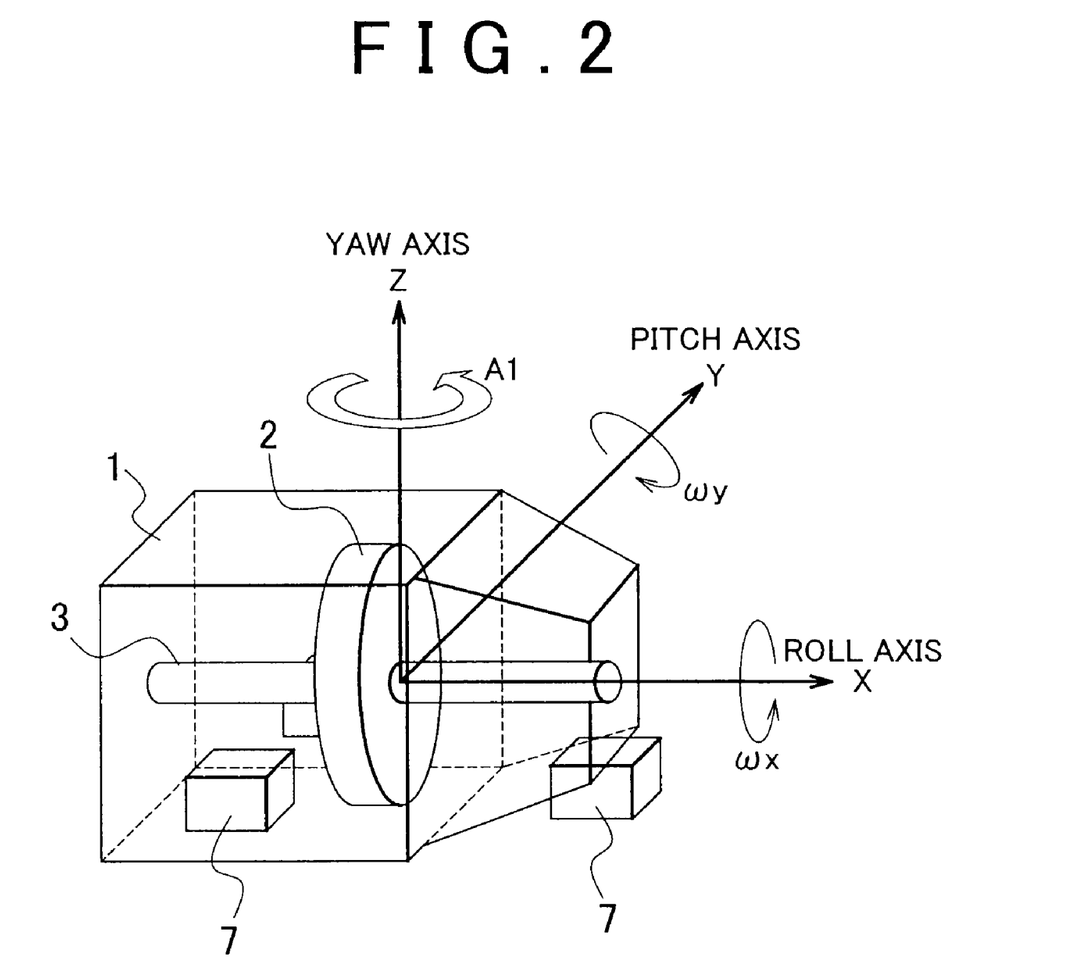
FIG. 2 is a view illustrating a vehicle behavior control method according to the first embodiment.

Referring to FIG. 2, the vehicle behavior control method according to the first embodiment will be described in detail. FIG. 2 is a perspective view of the power plant 1 in which an X axis and a Y axis are defined in a horizontal direction of the power plant 1 and a Z axis is defined in a vertical direction of the power plant 1 when the power plant 1 is disposed horizontally. The X axis substantially corresponds to the axis of the rotary shaft 3 of the rotary body 2. Note that in this specification, the X axis is defined as a roll axis of the power plant 1, the Y axis is defined as a pitch axis of the power plant 1, and the Z axis is defined as a yaw axis of the power plant 1. In other words, the X axis, the Y axis, and the Z axis are defined as the roll axis of the rotary body 2, the pitch axis of the rotary body 2, and the yaw axis of the rotary body 2, respectively.

The rotary body 2 of the power plant 1 rotates about the roll axis (X axis) as the engine rotates. In this case, an angular momentum H of the rotary body 2 is expressed by Equation (1) using a moment of inertia I of the rotary body 2 and an angular velocity ωx of the rotary body 2 about the roll axis.

$$H = I\omega x \tag{1}$$

The moment of inertia I is a constant prescribed on the basis of the mass of the rotary body 2 and so on, and the angular velocity ωx is determined in accordance with the engine rotation speed. When the power plant 1 is rotated about the pitch axis (Y axis) by controlling the power plant movement control apparatus 7 in this condition, a gyro moment is generated about the yaw axis (Z axis) of the power plant 1 in accordance with the law of conservation of angular momentum, as shown by a black-outlined arrow A1. Note that rotating the power plant 1 about the pitch axis corresponds to deflecting the direction of the rotary shaft 3 of the rotary body 2, and more specifically to varying the pitch angle velocity of the rotary body 2.

More specifically, a gyro moment M generated when the power plant 1 is moved about the pitch axis at an angular velocity (pitch angle velocity) ωy is expressed by Equation (2) using the aforementioned angular momentum H of the rotary body 2.

$$-M = H \times \omega y \tag{2}$$

The "×" in Equation (2) denotes a vector product. The gyro moment M corresponds to a moment having a magnitude of "Iωx×ωy" about the yaw axis (Z axis). In other words, by controlling the pitch angle velocity toy of the power plant 1 using the power plant movement control apparatus 7, the magnitude and direction of the gyro moment M generated in the yaw direction of the power plant 1 (hereafter, the yaw direction gyro moment M will be referred to simply as a "yaw moment") can be varied.

Figure 3:
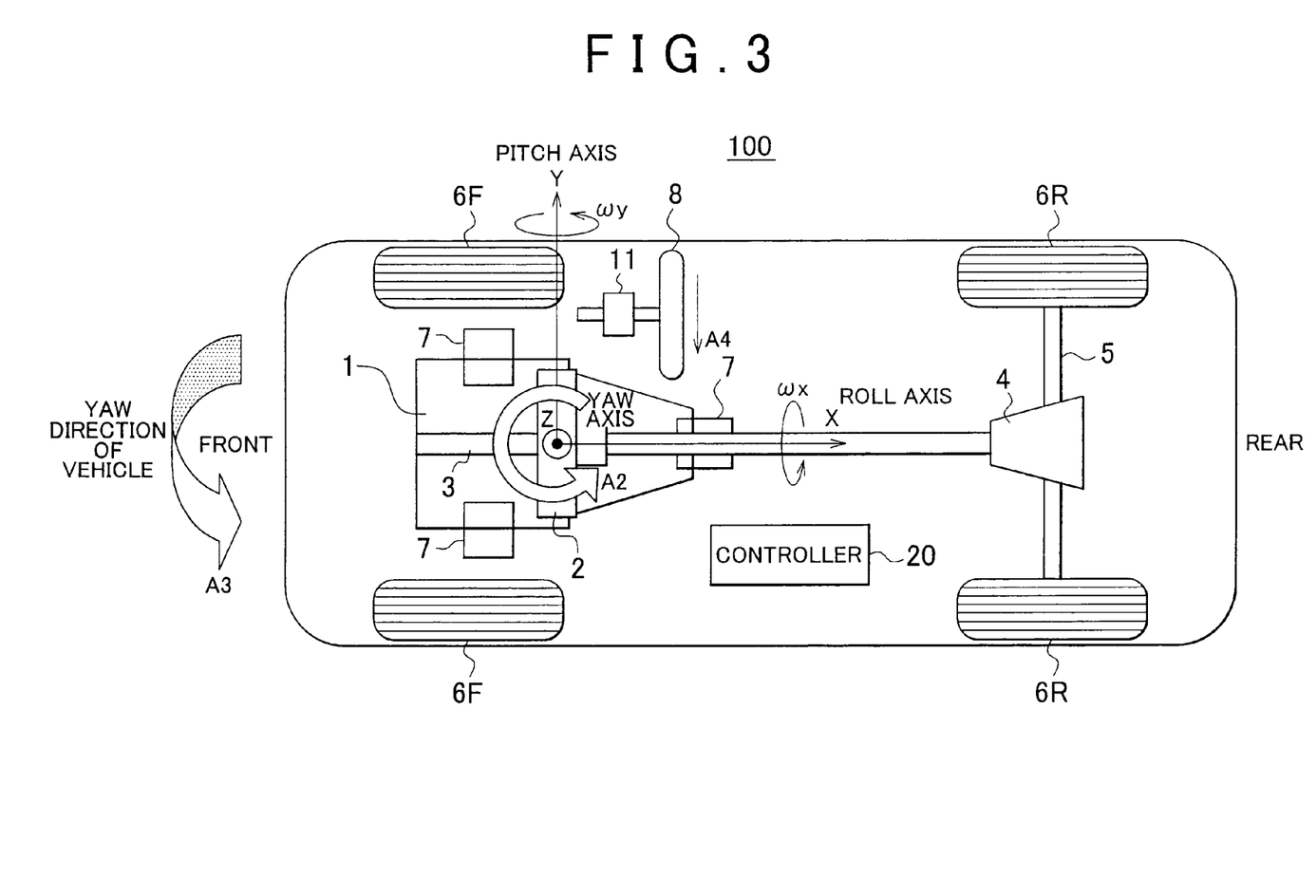
FIG. 3 is a view illustrating vehicle behavior according to the first embodiment.

FIG. 3 is a view illustrating vehicle behavior when a yaw moment is generated in the manner described above. The view shown FIG. 3 corresponds to the vehicle 100 shown in FIG. 1. As described above, when the power plant 1 including the internally rotating rotary body 2 is moved about the pitch axis, a yaw moment (gyro moment) is generated, as shown by an arrow A2. Since the power plant 1 is fixed to the vehicle 100, the moment acts on the vehicle 100 in the yaw direction, as shown by an arrow A3.

In the first embodiment, the controller 20 controls the vehicle behavior in the yaw direction of the vehicle 100 using the yaw moment (gyro moment) that is generated by moving the power plant 1 about the pitch axis in this manner. Specifically, first, the controller 20 sets a vehicle behavior target value on the basis of the steering performed by the driver (see arrow A4) to obtain a target vehicle behavior in relation to the yaw direction of the vehicle 100. More specifically, the controller 20 determines a steering direction and a steering speed from the steering angle obtained from the steering angle sensor 11, and sets a yaw moment (to be referred to as a "required yaw moment Mz" hereafter) to be applied to the vehicle 100 as the vehicle behavior target value on the basis of the steering direction and steering speed. For example, the controller 20 sets the required yaw moment Mz such that the responsiveness of the vehicle 100 to the steering improves, or in other words such that the steering feeling improves. Further, when steering-related vehicle behavior control is performed through other control, the controller 20 may set the required yaw moment Mz to compensate for a difference between the target vehicle behavior of the other control and the actual vehicle behavior when the other control is performed.

Next, the controller 20 calculates the pitch angle velocity ωy (magnitude, direction) of the power plant 1 required to realize the required yaw moment Mz determined in this manner. More specifically, the controller 20 calculates the pitch angle velocity toy using the moment of inertia I of the rotary body 2, the angular velocity ωx of the rotary body 2 about the roll axis, and the required yaw moment Mz. Here, when Equation (2) is used, the required yaw moment Mz corresponding to the gyro moment M is expressed by "Mz=H×ωy", which may be replaced by "Mz=Iωx×ωy", and therefore the pitch angle velocity ωy is expressed by the following Equation (3).

$$\omega y = Mz / (I\omega x) \tag{3}$$

The angular velocity ωx of the rotary body 2 about the roll axis in Equation (3) is determined in accordance with the engine rotation speed (detected by the engine rotation speed sensor 10). The controller 20 calculates the pitch angle velocity ωy using Equation (3). The controller 20 then controls the power plant movement control apparatus 7 such that the power plant 1 is moved at the calculated pitch angle velocity ωy.

According to the vehicle behavior control method of the first embodiment, the vehicle behavior can be controlled appropriately by using a pre-existing vehicle constitutional component such as an engine or a motor as the rotary body, and using a gyro moment that is generated by deflecting the direction of the rotary shaft of the rotary body. More specifically, the yaw direction operating performance of the vehicle 100 in relation to steering performed by the driver can be improved by appropriately using a yaw moment (gyro moment) generated through control of the pitch angle velocity ωy of the power plant 1. For example, the responsiveness of the vehicle 100 to steering input can be improved.

Figure 4:
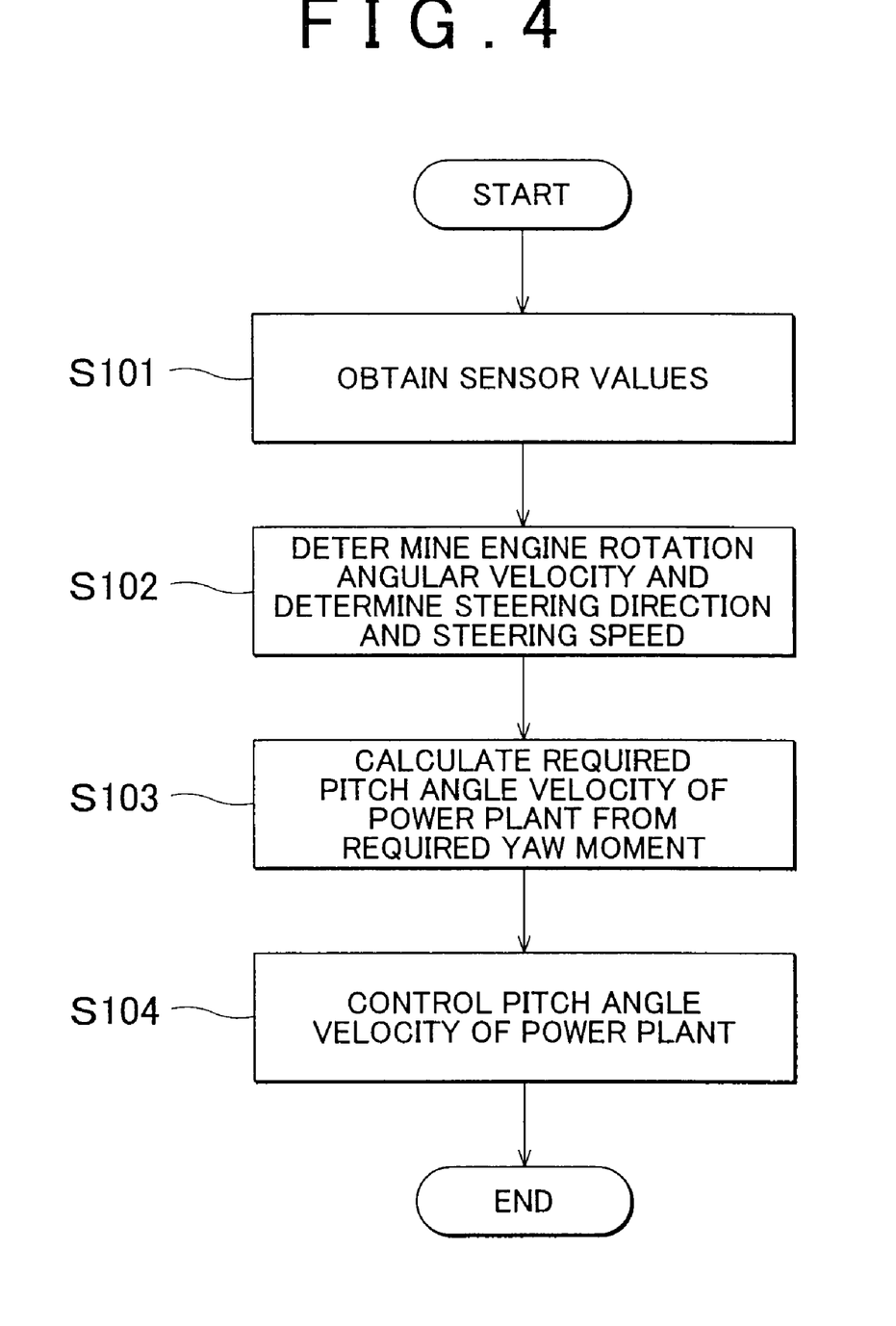
FIG. 4 is a flowchart showing pitch angle velocity control processing.

Next, an example of processing (pitch angle velocity control processing) executed in actuality by the controller 20 to realize the vehicle behavior control method described above will be described with reference to FIG. 4. FIG. 4 is a flowchart showing the pitch angle velocity control processing. This processing is executed when steering is input by the driver, for example.

First, in a step S101, the controller 20 obtains sensor values. More specifically, the controller 20 obtains the engine rotation speed from the engine rotation speed sensor 10 and the steering angle from the steering angle sensor 11. The processing then advances to a step S102. In the step S102, the controller 20 determines an engine rotation angular velocity, a steering direction, and a steering speed from the sensor values obtained in the step S101. Note that the engine rotation angular velocity corresponds to the angular velocity ωx of the rotary body 2 about the roll axis, described above. The processing then advances to a step S103.

In the step S103, first, the controller 20 determines the required yaw moment Mz on the basis of the steering direction, steering speed, and so on obtained in the step S102. For example, the controller 20 determines the required yaw moment Mz with the aim of improving the responsiveness of the vehicle 100 to steering, or in other words improving the steering feeling. The controller 20 then calculates the pitch angle velocity ωy of the power plant 1 required to realize the determined required yaw moment Mz. Specifically, the controller 20 calculates the pitch angle velocity ωy (magnitude, direction) using the moment of inertia I of the rotary body 2, the angular velocity ωx of the rotary body 2 about the roll axis, and the required yaw moment Mz. More specifically, the controller 20 calculates the pitch angle velocity ωy using the above Equation (3). The processing then advances to a step S104.

In the step S104, the controller 20 controls the power plant movement control apparatus 7 such that the power plant 1 is moved at the pitch angle velocity ωy calculated in the step S103. In other words, the controller 20 transmits a control signal corresponding to the pitch angle velocity ωy to the power plant movement control apparatus 7. When the processing described above is complete, the processing exits the flow.

According to this pitch angle velocity control processing, the yaw direction operating performance of the vehicle 100 relative to steering performed by the driver can be improved by appropriately using a yaw moment generated by controlling the pitch angle velocity ωy of the power plant 1.

Next, a second embodiment of the invention will be described.

In the second embodiment, similarly to the first embodiment, control to deflect the direction of the rotary shaft of the rotary body relative to the vehicle body is performed in accordance with a vehicle behavior target value. More specifically, control is performed to vary a pitch angle of a rotary body rotating in the interior of the power plant. However, in the first embodiment, the rotary shaft 3 of the power plant 1 is disposed in the front-rear direction of the vehicle 100, whereas in the second embodiment, the rotary shaft of the power plant is disposed in a left-right direction (lateral direction) of the vehicle. In other words, in the first embodiment, the power plant 1 is disposed longitudinally, whereas in the second embodiment, the power plant is disposed transversely.

Figure 5:
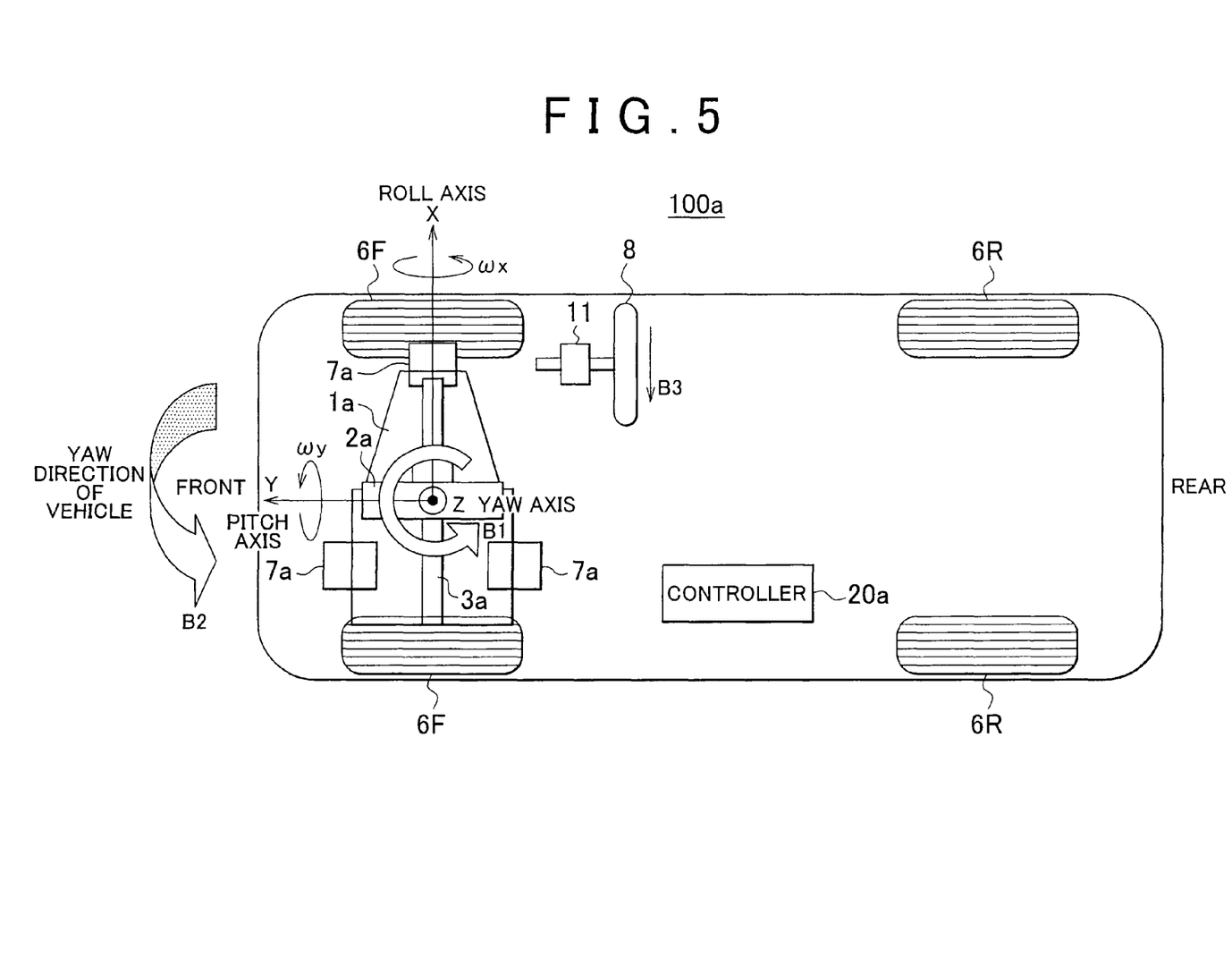
FIG. 5 is a schematic constitutional diagram of a vehicle according to a second embodiment.

FIG. 5 is a schematic diagram showing the constitution of a vehicle 100a to which a vehicle behavior control apparatus according to the second embodiment is applied. FIG. 5 is a view of the vehicle 100a seen from above, in which the left direction denotes the front of the vehicle and the right direction denotes the rear of the vehicle. Note that constitutional elements having identical reference symbols to those of FIG. 1 are identical to their counterparts in FIG. 1, and description thereof has been omitted.

The vehicle 100a differs from the vehicle 100 according to the first embodiment in that a power plant 1a is provided in place of the power plant 1, a power plant movement control apparatus 7a is provided in place of the power plant movement control apparatus 7, and a controller 20a is provided in place of the controller 20. The vehicle 100a corresponds to an FF vehicle in which the power plant 1a is disposed on the front side and the front wheels 6F are driven. A rotary shaft 3a of a rotary body 2a is disposed in the power plant 1a in a left-right direction (lateral direction) of the vehicle 100a, and the power plant 1a includes an engine, a transmission, and so on, not shown in the drawing.

In the vehicle 100 described above, the roll axis (X axis) direction of the power plant 1 matches the roll axis direction of the vehicle 100, and the pitch axis (Y axis) direction of the power plant 1 matches the pitch axis direction of the vehicle 100. In the vehicle 100a, on the other hand, the roll axis (X axis) of the power plant 1a corresponds to the pitch axis of the vehicle 100a and the pitch axis (Y axis) of the power plant 1a corresponds to the roll axis of the vehicle 100a. In other words, the positions of the pitch axis and roll axis of the power plant relative to the vehicle are opposite in the power plant 1 and the power plant 1a.

The power plant movement control apparatus 7a is provided in a plurality relative to the power plant 1a, and is constituted to be capable of varying the pitch axis angle of the power plant 1a. In other words, the power plant movement control apparatus 7a rotates the power plant 1a, including the rotary body 2a, about the pitch axis. For example, the power plant movement control apparatus 7a is formed using a so-called active control mount (ACM). The power plant movement control apparatus 7a is controlled by a control signal supplied by the controller 20a.

When the power plant 1a including the internally rotating rotary body 2a is rotated about the pitch axis by the power plant movement control apparatus 7a, a gyro moment (yaw moment) is generated about the yaw axis (Z axis) of the power plant 1a in accordance with the law of conservation of angular momentum, as shown by an arrow B1. As a result, a moment acts on the vehicle 100a in the yaw direction, as shown by an arrow B2.

The controller 20a is an electronic control unit that includes a CPU, ROM, RAM, and so on, not shown in the drawing, and performs control on the respective constitutional elements of the vehicle 100a. The controller 20a performs vehicle behavior control by functioning as a shaft deflection unit according to the invention together with the power plant movement control apparatus 7a. Specifically, the controller 20a performs similar processing to that of the controller 20 described above. In other words, the controller 20a obtains a target vehicle behavior in the yaw direction of the vehicle 100a by controlling the pitch angle velocity of the power plant 1a using a yaw moment (gyro moment) that is generated by moving the power plant 1a (rotary body 2a) about the pitch axis.

Specifically, first, the controller 20a sets a vehicle behavior target value on the basis of a steering operation performed by the driver (see arrow B3) to obtain a target vehicle behavior in relation to the yaw direction of the vehicle 100a. More specifically, the controller 20a determines the steering direction and steering speed from the steering angle obtained from the steering angle sensor 11, and sets a yaw moment (the required yaw moment Mz) to be applied to the vehicle 100a as the vehicle behavior target value on the basis of the steering direction and steering speed. For example, the controller 20a determines the required yaw moment Mz such that the responsiveness of the vehicle 100a to the steering improves, or in other words such that the steering feeling improves. Further, when steering-related vehicle behavior control is performed through other control, the controller 20a may set the required yaw moment Mz to compensate for a difference between the target vehicle behavior of the other control and the actual vehicle behavior when the other control is performed.

Next, the controller 20a calculates the pitch angle velocity ωy (magnitude, direction) of the power plant 1a required to realize the required yaw moment Mz determined in this manner. Specifically, the controller 20a calculates the pitch angle velocity ωy using the moment of inertia I of the rotary body 2a, the angular velocity ωx of the rotary body 2a about the roll axis, and the required yaw moment Mz. More specifically, the controller 20a calculates the pitch angle velocity ωy using Equation (3). The controller 20a then controls the power plant movement control apparatus 7a such that the power plant 1a is moved at the calculated pitch angle velocity ωy.

According to the second embodiment described above, the yaw direction operating performance of the vehicle 100a relative to steering performed by the driver can be improved by appropriately using a yaw moment (gyro moment) generated by controlling the pitch angle velocity ωy of the power plant 1a in relation to the vehicle 100a in which the power plant 1a is disposed transversely.

According to the invention, as described in the first and second embodiments, the yaw direction operating performance of the vehicle 100a can be improved appropriately using a gyro moment regardless of whether the vehicle is an FR vehicle or an FF vehicle (in other words, regardless of whether the power plant is disposed longitudinally or transversely).

Next, a third embodiment of the invention will be described.

In the third embodiment, similarly to the first and second embodiments, control to deflect the direction of the rotary shaft of the rotary body relative to the vehicle body is performed in accordance with a vehicle behavior target value. However, in the first and second embodiments, control is performed to vary the pitch angle of the rotary body rotating in the interior of the power plant, whereas in the third embodiment, control is performed to vary an angle of the rotary body rotating in the interior of the power plant about the yaw axis (to be referred to hereafter as a "yaw angle"). More specifically, in the third embodiment, a yaw angle velocity of the rotary body is controlled using a gyro moment generated by moving the rotary body about the yaw axis, whereby a target vehicle behavior in the pitch direction of the vehicle is obtained.

Note that in the second embodiment described above, the rotary shaft 3a of the power plant 1a is disposed in the left-right direction (lateral direction) of the vehicle 100a, whereas in the third embodiment, the rotary shaft of the power plant is disposed in the front-rear direction of the vehicle. In other words, in the third embodiment, similarly to the first embodiment, the power plant is disposed longitudinally. Accordingly, the third embodiment will be described below with comparisons to the first embodiment.

Figure 6:
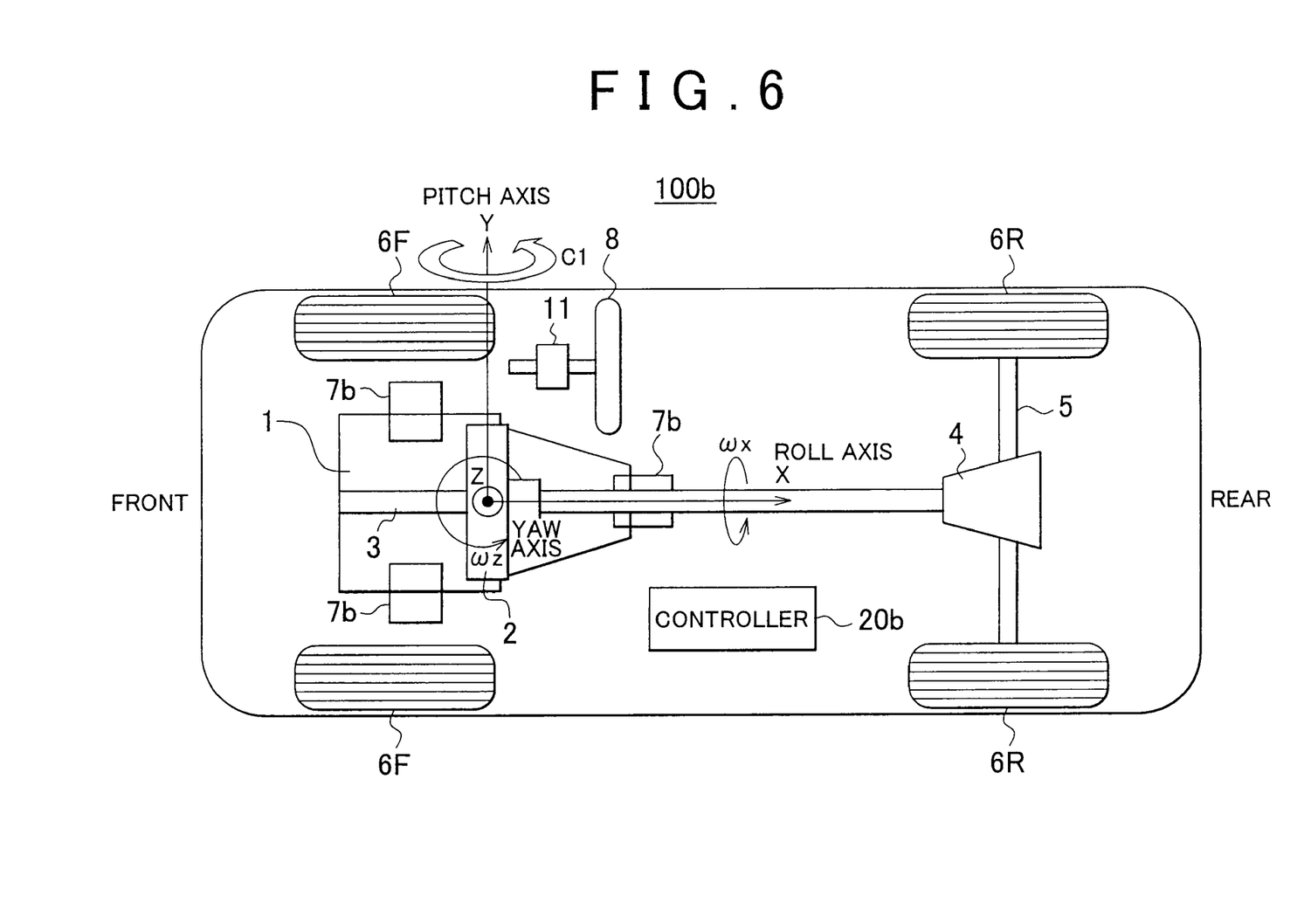
FIG. 6 is a schematic constitutional diagram of a vehicle according to a third embodiment.

FIG. 6 is a schematic diagram showing the constitution of a vehicle 100b to which a vehicle behavior control apparatus according to the third embodiment is applied. FIG. 6 is a view of the vehicle 100b seen from above, in which the left direction denotes the front of the vehicle and the right direction denotes the rear of the vehicle. Note that constitutional elements having identical reference symbols to those of FIG. 1 are identical to their counterparts in FIG. 1, and description thereof has been omitted.

The vehicle 100b differs from the vehicle 100 according to the first embodiment in that a power plant movement control apparatus 7b is provided in place of the power plant movement control apparatus 7 and a controller 20b is provided in place of the controller 20. In the third embodiment, similarly to the first embodiment and in contrast to the second embodiment, the rotary shaft 3 of the power plant 1 is disposed in the front-rear direction of the vehicle 100b. Note that the constitution of the power plant 1 provided in the vehicle 100b is substantially identical to the constitution of the power plant 1 of the vehicle 100 according to the first embodiment.

The power plant movement control apparatus 7b is provided in a plurality relative to the power plant 1, and is constituted to be capable of varying a yaw axis angle of the power plant 1. In other words, the power plant movement control apparatus 7b rotates the power plant 1, including the rotary body 2, about the yaw axis. For example, the power plant movement control apparatus 7b is formed using a so-called active control mount (ACM). The power plant movement control apparatus 7b is controlled by a control signal supplied by the controller 20b. When the power plant 1 including the internally rotating rotary body 2 is rotated about the yaw axis by the power plant movement control apparatus 7b, a gyro moment is generated about the pitch axis (Y axis) of the power plant 1 in accordance with the law of conservation of angular momentum, as shown by an arrow C1.

The controller 20b is an electronic control unit that includes a CPU, ROM, RAM, and so on, not shown in the drawing, and performs control on the respective constitutional elements of the vehicle 100b. The controller 20b performs vehicle behavior control by functioning as a shaft deflection unit according to the invention together with the power plant movement control apparatus 7b. Specifically, the controller 20b sets a vehicle behavior target value to obtain a target vehicle behavior, and performs control to vary the yaw angle of the power plant 1 (rotary body 2) by controlling the power plant movement control apparatus 7b in accordance with the vehicle behavior target value. More specifically, the controller 20b obtains the target vehicle behavior in the pitch direction of the vehicle 100b by controlling the yaw angle velocity of the power plant 1 using a gyro moment generated by moving the power plant 1 about the yaw axis, as described above.

Figure 7:
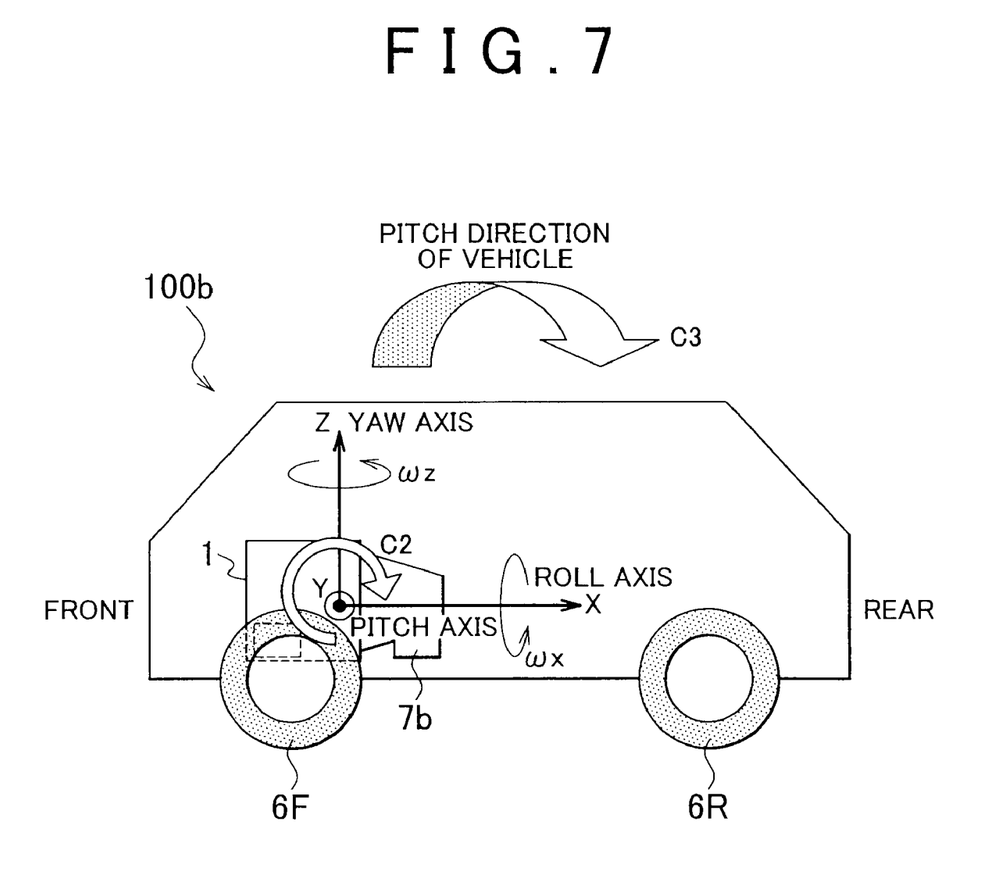
FIG. 7 is a view illustrating a vehicle behavior control method according to the third embodiment.

Referring to FIG. 7, a vehicle behavior control method according to the third embodiment will now be described in detail. FIG. 7 is a schematic diagram showing the vehicle 100b from the direction of an arrow P1 in FIG. 6. Note that in FIG. 7, only the power plant 1 and the power plant movement control apparatus 7b are illustrated as interior constitutional elements of the vehicle 100b for ease of description.

When the power plant 1 including the internally rotating rotary body 2 is rotated about the yaw axis by the power plant movement control apparatus 7b, a gyro moment is generated about the pitch axis (Y axis) of the power plant 1 in accordance with the law of conservation of angular momentum, as shown by an arrow C2. In this case, a gyro moment M generated when the power plant 1 is moved about the yaw axis at an angular velocity (yaw angle velocity) ωz is expressed by Equation (4) using the aforementioned angular momentum H of the rotary body 2 (see Equation (1)).

$$-M = H \times \omega z \quad (4)$$

The "×" in Equation (4) denotes a vector product. The gyro moment M corresponds to a moment having a magnitude of "I×ω×ωz" about the pitch axis (Y axis). In other words, by controlling the yaw angle velocity ωz of the power plant 1 using the power plant movement control apparatus 7b, the magnitude and direction of the gyro moment M generated in the pitch direction of the power plant 1 (hereafter, the pitch direction gyro moment M will be referred to simply as a "pitch moment") can be varied.

When a pitch moment is generated in the power plant 1 in this manner, a moment acts on the vehicle 100b in the pitch direction, as shown by an arrow C3. In the third embodiment, the controller 20b controls the vehicle behavior in the pitch direction of the vehicle 100b using a pitch moment (gyro moment) generated by moving the power plant 1 about the yaw axis in this manner.

Specifically, first, the controller 20b sets a vehicle behavior target value to obtain a target vehicle behavior in relation to the pitch direction of the vehicle 100b. More specifically, the controller 20b sets a pitch moment (to be referred to as a "required pitch moment My" hereafter) to be applied to the vehicle 100b as the vehicle behavior target value such that during acceleration and deceleration, the attitude of the vehicle 100b in the pitch direction is stabilized. For example, the controller 20b sets the required pitch moment My by estimating the attitude of the vehicle 100*b* from the output of a stroke sensor during acceleration and deceleration or estimating the attitude of the vehicle 100*b* from the acceleration such that vehicle attitude variation during acceleration and deceleration is suppressed. Further, when vehicle attitude-related control (for example, control using an active suspension) is performed through other control, the controller 20*b* may set the required pitch moment My to compensate for a difference between the target vehicle attitude of the other control and the actual vehicle attitude when the other control is performed.

Next, the controller 20*b* calculates the yaw angle velocity ωz (magnitude, direction) of the power plant 1 required to realize the required pitch moment My determined in this manner. More specifically, the controller 20*b* calculates the yaw angle velocity ωz using the moment of inertia I of the rotary body 2, the angular velocity ωx of the rotary body 2 about the roll axis, and the required pitch moment My. Here, when Equation (4) is used, the required pitch moment My corresponding to the gyro moment M is expressed by "My=H×ωz", which may be replaced by "My=Iωxωz", and therefore the yaw angle velocity ωz is expressed by the following Equation (5).

$$\omega z = My/(I\omega x) \quad (5)$$

The angular velocity ωx of the rotary body 2 about the roll axis in Equation (5) is determined in accordance with the engine rotation speed (detected by the engine rotation speed sensor 10). The controller 20*b* calculates the yaw angle velocity ωz using Equation (5). The controller 20*b* then controls the power plant movement control apparatus 7*b* such that the power plant 1 is moved at the calculated yaw angle velocity ωz.

According to the third embodiment described above, a pitch direction operating performance of the vehicle 100*b* during acceleration and deceleration can be improved by appropriately using a pitch moment (gyro moment) generated by controlling the yaw angle velocity ωz of the power plant 1. For example, the attitude of the vehicle 100*b* during acceleration and deceleration can be stabilized.

Note that an example in which control is performed to vary only the yaw angle of the power plant 1 was described above, but the invention is not limited thereto. In another example, control may also be performed to vary the pitch angle of the power plant 1 in addition to the yaw angle of the power plant 1. In other words, the control according to the third embodiment may be combined with the control according to the first embodiment. In this case, the power plant movement control apparatus is constituted to be capable of rotating the power plant 1 about both the yaw axis and the pitch axis. Further, when constituted in this manner, the power plant movement control apparatus becomes capable of rotating the power plant 1 in a diagonal direction as well as about the yaw axis and the pitch axis. In other words, the direction of the rotary shaft 3 of the rotary body 2 in the power plant 1 may be deflected in various directions.

Next, a fourth embodiment of the invention will be described.

In the fourth embodiment, similarly to the first to third embodiments, control to deflect the direction of the rotary shaft of the rotary body relative to the vehicle body is performed in accordance with a vehicle behavior target value. More specifically, in the fourth embodiment, similarly to the third embodiment, control is performed to vary the yaw angle of the rotary body rotating in the interior of the power plant. However, in the third embodiment, the rotary shaft 3 of the power plant 1 is disposed in the front-rear direction of the vehicle 100*b*, whereas in the fourth embodiment, the rotary shaft of the power plant is disposed in the left-right direction (lateral direction) of the vehicle. Therefore, a gyro moment that is generated about the pitch axis of the power plant by varying the yaw angle of the rotary body acts as a moment in the pitch direction of the vehicle 100*b* in the third embodiment, but acts as a moment in the roll direction of the vehicle in the fourth embodiment. Hence, in the fourth embodiment, a target vehicle behavior in the roll direction of the vehicle is obtained by controlling the yaw angle velocity of the rotary body using a gyro moment generated by moving the rotary body about the yaw.

Note that in the fourth embodiment, similarly to the second embodiment, the rotary shaft of the power plant is disposed in the left-right direction (lateral direction) of the vehicle. Accordingly, the fourth embodiment will be described below with comparisons to the second embodiment.

Figure 8:
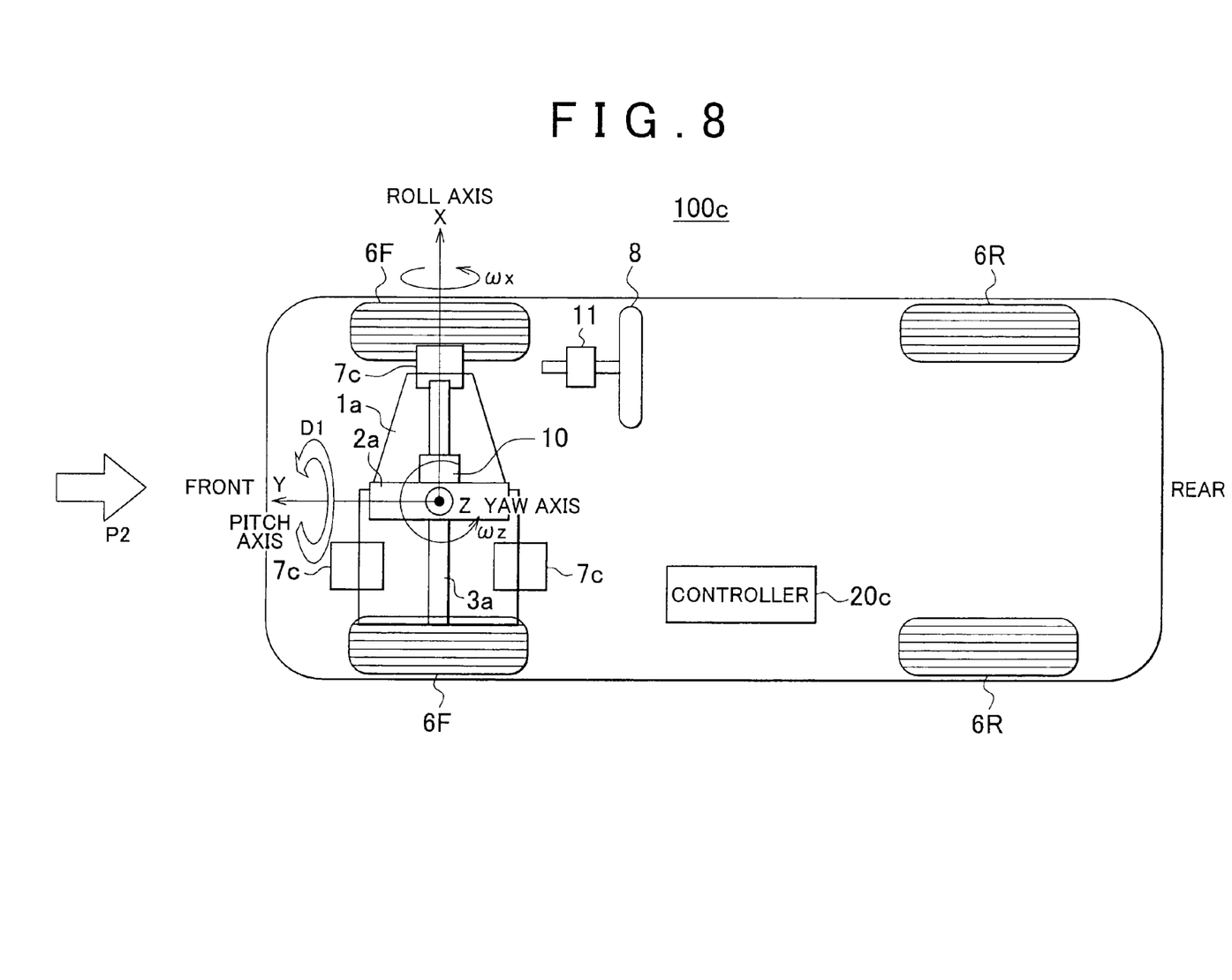
FIG. 8 is a schematic constitutional diagram of a vehicle according to a fourth embodiment.

FIG. 8 is a schematic diagram showing the constitution of a vehicle 100*c* to which a vehicle behavior control apparatus according to the fourth embodiment is applied. FIG. 8 is a view of the vehicle 100*c* seen from above, in which the left direction denotes the front of the vehicle and the right direction denotes the rear of the vehicle. Note that constitutional elements having identical reference symbols to those of FIG. 5 are identical to their counterparts in FIG. 5, and description thereof has been omitted.

The vehicle 100*c* differs from the vehicle 100*a* according to the second embodiment in that a power plant movement control apparatus 7*c* is provided in place of the power plant movement control apparatus 7*a* and a controller 20*c* is provided in place of the controller 20*a*. In the fourth embodiment, similarly to the second embodiment, the rotary shaft 3*a* of the power plant 1*a* is disposed in the left-right direction (lateral direction) of the vehicle 100*c*. Note that the constitution of the power plant 1*a* provided in the vehicle 100*c* is substantially identical to the constitution of the power plant 1*a* of the vehicle 100*a* according to the second embodiment.

The power plant movement control apparatus 7*c* is provided in a plurality relative to the power plant 1*a*, and is constituted to be capable of varying the yaw axis angle of the power plant 1*a*. In other words, the power plant movement control apparatus 7*c* rotates the power plant 1*a*, including the rotary body 2*a*, about the yaw axis. For example, the power plant movement control apparatus 7*c* is formed using a so-called active control mount (ACM). The power plant movement control apparatus 7*c* is controlled by a control signal supplied by the controller 20*c*. When the power plant 1*a* including the internally rotating rotary body 2*a* is rotated about the yaw axis by the power plant movement control apparatus 7*c*, a gyro moment is generated about the pitch axis (Y axis) of the power plant 1*a* in accordance with the law of conservation of angular momentum, as shown by an arrow D1.

The controller 20*c* is an electronic control unit that includes a CPU, ROM, RAM, and so on, not shown in the drawing, and performs control on the respective constitutional elements of the vehicle 100*c*. The controller 20*c* performs vehicle behavior control by functioning as a shaft deflection unit according to the invention together with the power plant movement control apparatus 7*c*. Specifically, the controller 20*c* sets a vehicle behavior target value to obtain a target vehicle behavior, and performs control to vary the yaw angle of the power plant 1*a* (rotary body 2*a*) by controlling the power plant movement control apparatus 7*c* in accordance with the vehicle behavior target value. More specifically, the controller 20*c* obtains a target vehicle behavior in the roll direction of the vehicle 100*c* by controlling the yaw angle velocity of the power plant 1a using a gyro moment generated by moving the power plant 1a about the yaw axis, as described above.

Figure 9:
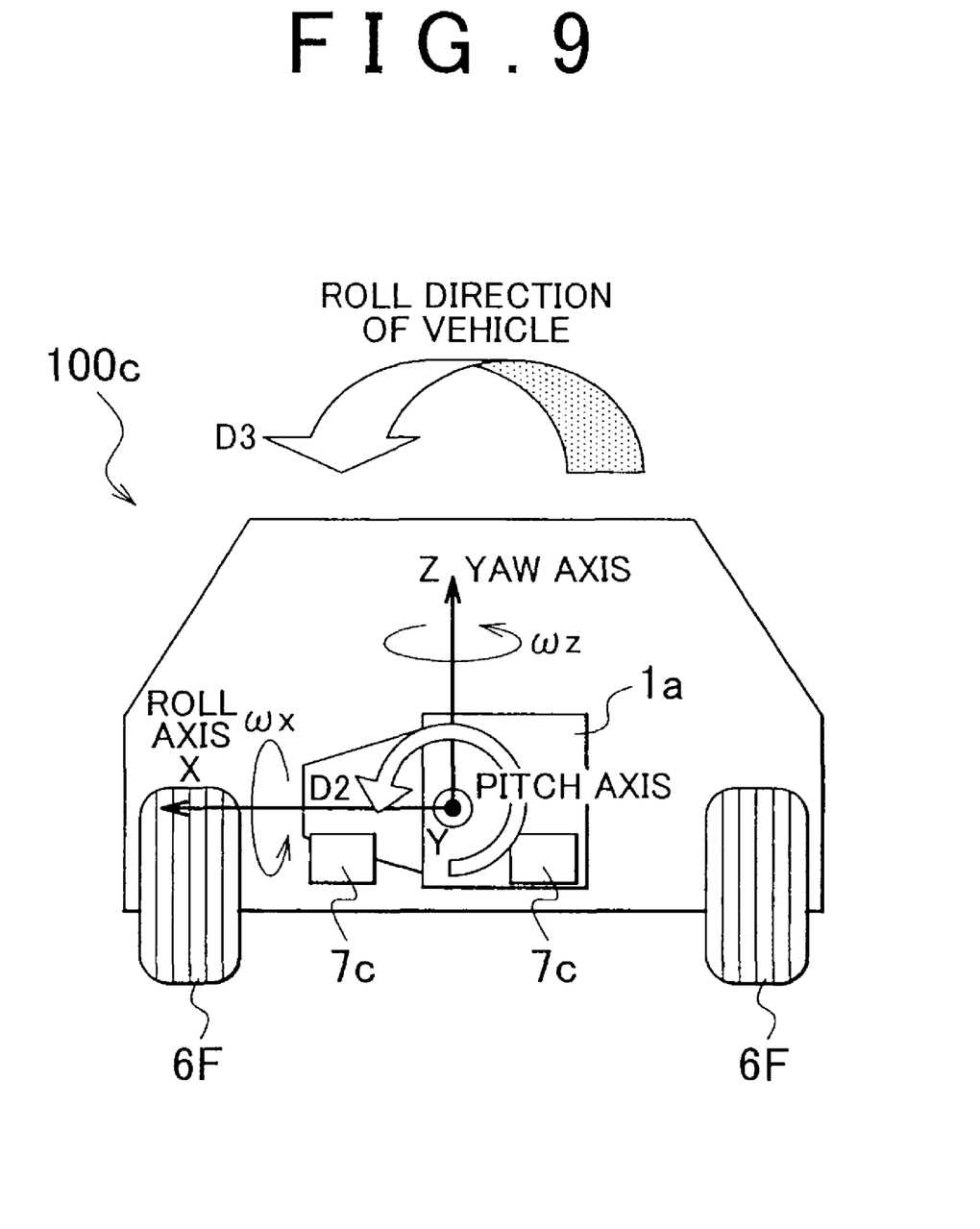
FIG. 9 is a view illustrating a vehicle behavior control method according to the fourth embodiment.

Referring to FIG. 9, a vehicle behavior control method according to the fourth embodiment will now be described in detail. FIG. 9 is a schematic diagram showing the vehicle 100c from the direction of an arrow P2 in FIG. 8. Note that in FIG. 9, only the power plant 1a and the power plant movement control apparatus 7c are illustrated as interior constitutional elements of the vehicle 100c for ease of description.

When the power plant 1a including the internally rotating rotary body 2a is rotated about the yaw axis by the power plant movement control apparatus 7c, a gyro moment is generated about the pitch axis (Y axis) of the power plant 1a in accordance with the law of conservation of angular momentum, as shown by an arrow D2. In this case, a gyro moment M generated when the power plant 1a is moved about the yaw axis at an angular velocity (yaw angle velocity) $\omega z$ is expressed by Equation (6) using the aforementioned angular momentum H of the rotary body 2a (see Equation (1)).

$$-M = H \times \omega z \qquad (6)$$

The "×" in Equation (6) denotes a vector product. The gyro moment M corresponds to a moment having a magnitude of "I×ωx×ωz" about the pitch axis (Y axis). In other words, by controlling the yaw angle velocity $\omega z$ of the power plant 1a using the power plant movement control apparatus 7c, the magnitude and direction of the gyro moment M generated in the pitch direction of the power plant 1a (hereafter, the pitch direction gyro moment M will be referred to simply as a "pitch moment") can be varied.

When a pitch moment is generated in the power plant 1a in this manner, a moment acts on the vehicle 100c in the roll direction, as shown by an arrow D3. In the fourth embodiment, the controller 20c controls the vehicle behavior in the roll direction of the vehicle 100c using a pitch moment (gyro moment) generated by moving the power plant 1a about the yaw axis in this manner.

Specifically, first, the controller 20c sets a vehicle behavior target value to obtain a target vehicle behavior in relation to the roll direction of the vehicle 100c. Specifically, the controller 20c sets the vehicle behavior target value on the basis of a steering operation performed by the driver such that the target vehicle behavior in relation to the roll direction of the vehicle 100c is obtained. More specifically, the controller 20c sets a pitch moment (to be referred to as a "required pitch moment My" hereafter) to be applied to the vehicle 100c as the vehicle behavior target value during steering, or in other words when the vehicle 100c turns, in order to stabilize the attitude of the vehicle 100c in the roll direction. For example, the controller 20c sets the required pitch moment My on the basis of the steering angle obtained from the steering angle sensor 11, the attitude of the vehicle 100c, and so on such that during turning, the attitude of the vehicle is flat. Further, when roll direction vehicle behavior control (for example, control using an active suspension) is performed through other control, the controller 20c may set the required pitch moment My to compensate for a difference between the target vehicle behavior of the other control and the actual vehicle behavior when the other control is performed.

Next, the controller 20c calculates the yaw angle velocity $\omega z$ of the power plant 1a required to realize the required pitch moment My determined in this manner. More specifically, the controller 20c calculates the yaw angle velocity $\omega z$ using the moment of inertia I of the rotary body 2a, the angular velocity $\omega x$ of the rotary body 2a about the roll axis, and the required pitch moment My. Here, when Equation (6) is used, the required pitch moment My corresponding to the gyro moment M is expressed by "My=H×ωz", which may be replaced by "My=Iωx×ωz", and therefore the yaw angle velocity $\omega z$ is expressed by the following Equation (7).

$$\omega z = My/(I\omega x) \qquad (7)$$

The angular velocity $\omega x$ of the rotary body 2a about the roll axis in Equation (7) is determined in accordance with the engine rotation speed (detected by the engine rotation speed sensor 10). The controller 20c calculates the yaw angle velocity $\omega z$ using Equation (7). The controller 20c then controls the power plant movement control apparatus 7c such that the power plant 1a is moved at the calculated yaw angle velocity $\omega z$.

According to the fourth embodiment described above, a roll direction operating performance of the vehicle 100c can be improved by appropriately using a pitch moment (gyro moment) generated by controlling the yaw angle velocity $\omega z$ of the power plant 1a. For example, the attitude of the vehicle 100c during turning can be stabilized.

Note that an example in which control is performed to vary only the yaw angle of the power plant 1a was described above, but the invention is not limited thereto. In another example, control may also be performed to vary the pitch angle of the power plant 1a in addition to the yaw angle of the power plant 1a. In other words, the control according to the fourth embodiment may be combined with the control according to the second embodiment. In this case, the power plant movement control apparatus is constituted to be capable of rotating the power plant 1a about both the yaw axis and the pitch axis. Further, when constituted in this manner, the power plant movement control apparatus becomes capable of rotating the power plant 1a in a diagonal direction as well as about the yaw axis and the pitch axis. In other words, the direction of the rotary shaft 3a of the rotary body 2a in the power plant 1a may be deflected in various directions.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single elements, are also within the spirit and scope of the invention.

What is claimed is:

1. A vehicle behavior control apparatus comprising:
a rotary body formed as a part of a power plant installed in a vehicle; and
a shaft deflection unit that sets a vehicle behavior target value for obtaining a target vehicle behavior, and deflects a direction of a rotary shaft of the rotary body which is provided between the rotary body and a wheel of the vehicle, by adjusting an angle of the rotary shaft relative to a short axis of the vehicle body, in accordance with the vehicle behavior target value, wherein
the rotary shaft of the rotary body is disposed in a right-left direction of the vehicle, and the shaft deflection unit deflects the direction of the rotary shaft by varying a pitch angle of the rotary body relative to the short axis of the vehicle body.

2. The vehicle behavior control apparatus according to claim 1, wherein the shaft deflection unit deflects the rotary shaft on the basis of a rotation speed of the rotary body.

3. The vehicle behavior control apparatus according to claim 1, wherein the shaft deflection unit sets a speed at which the rotary shaft is deflected on the basis of a rotation speed of the rotary body.

4. The vehicle behavior control apparatus according to claim 1, wherein the shaft deflection unit sets the vehicle behavior target value on the basis of steering performed by a driver in order to obtain a target vehicle behavior in relation to a yaw direction of the vehicle.

5. A vehicle behavior control apparatus comprising:
a rotary body formed as a part of a power plant installed in a vehicle; and
a shaft deflection unit that sets a vehicle behavior target value for obtaining a target vehicle behavior, and deflects a direction of a rotary shaft of the rotary body which is provided between the rotary body and a wheel of the vehicle, by adjusting an angle of the rotary shaft relative to a long or short axis of the vehicle body, in accordance with the vehicle behavior target value, wherein
the rotary shaft of the rotary body is disposed in a front-rear direction of the vehicle, and the shaft deflection unit deflects the direction of the rotary shaft by varying a yaw angle of the rotary body.

6. The vehicle behavior control apparatus according to claim 5, wherein the shaft deflection unit sets the vehicle behavior target value on the basis of an attitude of the vehicle in order to obtain a target vehicle behavior in relation to a pitch direction of the vehicle.

7. A vehicle behavior control apparatus comprising:
a rotary body formed as a part of a power plant installed in a vehicle; and
a shaft deflection unit that sets a vehicle behavior target value for obtaining a target vehicle behavior, and deflects a direction of a rotary shaft of the rotary body which is provided between the rotary body and a wheel of the vehicle, by adjusting an angle of the rotary shaft relative to a long or short axis of the vehicle body, in accordance with the vehicle behavior target value, wherein
the rotary shaft of the rotary body is disposed in a right-left direction of the vehicle, and the shaft deflection unit deflects the direction of the rotary shaft by varying a yaw angle of the rotary body.

8. The vehicle behavior control apparatus according to claim 7, wherein the shaft deflection unit sets the vehicle behavior target value on the basis of steering performed by a driver in order to obtain a target vehicle behavior in relation to a roll direction of the vehicle.

9. The vehicle behavior control apparatus according to claim 1, wherein the shaft deflection unit comprises a controller that sets the vehicle behavior target value, and a power plant movement control apparatus that is controlled by the controller.

10. The vehicle behavior control apparatus according to claim 9, wherein the power plant movement control apparatus is an engine mount.

11. The vehicle behavior control apparatus according to claim 10, wherein the power plant movement control apparatus is a mount having a built-in actuator.

12. A vehicle behavior control method comprising:
calculating a rotation speed of a rotary body formed as a part of a power plant installed in a vehicle;
setting a vehicle behavior target value for obtaining a target behavior on the basis of the rotation speed; and
deflecting a direction of a rotary shaft of the rotary body which is provided between the rotary body and a wheel of the vehicle, by adjusting an angle of the rotary shaft relative to a short axis of the vehicle body, in accordance with the vehicle behavior target value, wherein
the rotary shaft of the rotary body is disposed in a right-left direction of the vehicle, and the shaft deflection unit deflects the direction of the rotary shaft by varying a pitch angle of the rotary body relative to the short axis of the vehicle body.

13. The vehicle behavior control method according to claim 12, further comprising:
detecting a steering direction and a steering speed of the vehicle, wherein
the vehicle behavior target value is set in relation to a yaw direction vehicle behavior of the vehicle on the basis of the steering direction and the steering speed, and
the rotary shaft of the rotary body is deflected in a pitch direction of the rotary body.

14. The vehicle behavior control method according to claim 12, further comprising:
estimating an attitude of the vehicle, wherein
the vehicle behavior target value is set in relation to a pitch direction vehicle behavior of the vehicle on the basis of the attitude of the vehicle, and
the rotary shaft of the rotary body is deflected in a yaw direction of the rotary body.

* * * * *